United States Patent [19]
Jackson

[11] 3,766,697
[45] Oct. 23, 1973

[54] RUBBER GASKET WITH PLASTIC MOLDING INSERT

[75] Inventor: Norman C. Jackson, Sheffield Lake, Ohio

[73] Assignee: The Standard Products Company, Cleveland, Ohio

[22] Filed: Sept. 22, 1971

[21] Appl. No.: 182,738

[52] U.S. Cl............... 52/312, 52/400, 52/718, 161/120
[51] Int. Cl............................................. E04f 19/02
[58] Field of Search................... 52/309, 312, 400, 52/716, 208, 718; 161/5, 99, 100, 118-121, 413; 293/62, 54 B

[56] References Cited
UNITED STATES PATENTS

| | | | |
|---|---|---|---|
| 2,556,775 | 6/1951 | Oswald | 52/208 |
| 2,772,915 | 12/1956 | Renno | 52/400 X |
| 2,612,972 | 10/1952 | Heimgartner et al. | 52/400 |
| 3,458,386 | 7/1969 | Shanok et al. | 52/312 |

FOREIGN PATENTS OR APPLICATIONS

| | | | |
|---|---|---|---|
| 1,014,924 | 12/1965 | Great Britain | 161/117 |

Primary Examiner—Alfred C. Perham
Attorney—Meyer et al.

[57] ABSTRACT

A gasket and decorative trim assembly is provided for mounting a fixed window panel such as a windshield relative to the window opening in a vehicle and for sealing the joint between the window panel and vehicle. The assembly includes a gasket portion by which the mounting and sealing is achieved and a trim strip portion which provides the marginal area of the mounted window panel with a decorative appearance. The gasket portion is produced from rubber material and the trim strip portion is interengaged therewith by cooperative slot means in the gasket portion and projection means on the trim portion. The structural relationship between the gasket portion and trim portion provides for the use of narrower gasket components and/or wider trim strip components than heretofore possible.

3 Claims, 3 Drawing Figures

Patented Oct. 23, 1973  3,766,697

INVENTOR.
NORMAN C. JACKSON
BY
Meyer, Tilberry & Body
ATTORNEYS

RUBBER GASKET WITH PLASTIC MOLDING INSERT

The present invention relates to the art of resilient gaskets and, more particularly, to gasket and decorative trim structures for mounting a panel relative to an adjacent surface, sealing the joint between the panel and surface and providing the assembly with a decorative appearance.

Gasket structures have been provided heretofore for the purpose of mounting a panel component relative to adjacent surface means in a manner whereby the joint between the panel and surface means is sealed by the gasket against the passage of air, water, and the like therebetween. For example, in the automotive industry such gasket structures are employed to mount a fixed window pane relative to a window opening defined in the vehicle body. Such a window pane may, for example, define the windshield of the vehicle and the gasket means provides for mounting the windshield relative to the opening therefor in the vehicle and for sealing the joint between the windshield and vehicle against the ingress or leakage of air and water therebetween. Such gasket structures have an exposed exterior surface which defines, in appearance a peripheral border extending around the window pane or windshield.

Since gaskets of the above nature are generally made from black rubber, it is desirable to provide decorative means overlying the outer surface of the gasket to provide the window pane or windshield with a border which is decorative in appearance. One of the most desirable ways to provide the gasket with a decorative appearance is by the use of trim strip means having a decorative outer surface and which is interconnected with the gasket to overlie the outer surface of the gasket. In the attachment of such a trim strip to a gasket of resilient material certain problems are encountered which, prior to the present invention, limited either the width of a trim strip which could be employed with a gasket of a given width, or limited the narrowness of a gasket component which could be employed together with a trim strip of given width. In this respect, it will be appreciated that the material from which the gasket is made must have sufficient resilience to permit bending thereof to the peripheral contour of the window pane and opening and at the same time assure proper sealing engagement thereof with the underlying surfaces of the window panel and vehicle. Moreover, the resiliency of the gasket material together with the structure of the gasket must be such that retention of a substantial portion of the window pane is assured in the event of an impact thereagainst from within the vehicle such as might occur by the driver or a passenger being propelled against the panel upon impact of the vehicle with an object such as another vehicle. With regard in particular to windshields, it is today required that about 75 percent of windshield panel be retained in place relative to the vehicle upon an impact of a person thereagainst such as might occur in an accident involving the vehicle. Thus, the sealing and pane retention capabilities of the gasket component are of primary concern, and the provision of decorative means for the gasket must be achieved without adversely effecting the sealing and panel retention capabilities.

Gaskets of the character referred to hereinabove are elongate elements of suitable resilient material such as rubber and generally include a pair of flanges or wings extending longitudinally along opposite sides thereof for sealing engagement with corresponding underlying surfaces, one of which is the window panel and the other of which is surface means of the vehicle body. Further, means is provided intermediate the lateral outer ends of the flanges or wings to facilitate mounting of the gasket relative to the vehicle body. The wings are contoured in cross-section to resiliently engage the corresponding underlying surface in sealing relationship with respect thereto, and in order to provide the lateral flexibility necessary to permit the gasket to be bent or curved to conform with the outer contour of the window panel and window opening in the vehicle, the wing components are relatively thin in a direction transverse to the outer surface thereof. Accordingly, certain problems have been encountered heretofore in attempting to provide the outer surface of such a gasket with desired decorative means without effecting the sealing, bendability and retention functions of the gasket. In this respect, if it is desired to provide the decorative appearance by attaching trim strip means to the outer surface of the gasket the trim strip means must be quite narrow relative to the lateral width of the gasket. Otherwise, the gasket will not have the necessary lateral and transverse flexibility to assure the desired sealing engagement of the flanges with underlying surfaces and the desired bending or flexing of the gasket for the gasket to conform to the peripheral contour of the window panel and window opening in the vehicle. Thus, if a wide trim strip is desired the lateral width of the gasket must be increased accordingly to retain the sealing and bending capabilities sought. It remains, however, that the relative lateral dimensions of the gasket and trim strip are dependent on the sealing and bending capabilities of the gasket, whereby such a wider gasket while providing for a wider trim strip still does not provide a desirable structure in that the lateral dimension of the trim strip is still narrow in comparison to that of the gasket. In other words, the lateral dimension of the trim strip limits the minimum lateral dimension of the gasket which can be employed in a given situation. Moreover, while a trim strip of desired width can be employed, it will be appreciated that the cost of the gasket and trim assembly is considerably increased as a result of having to employ a wider gasket. Still further, it will be appreciated that there are limits with respect to the maximum width of a gasket which can be employed in a given situation. Therefore, it is often impossible to provide a gasket component of a given width with trim strip means having a desired width relative thereto in order to provide the gasket with the most desirable decorative appearance.

The above problem can, of course, be solved by first assembling the gasket with respect to the vehicle window panel and window opening and then attaching separate trim strip means of a desired width thereto, such as by adhesive bonding. Such a procedure is undesirable, however, in that considerable time and effort is required to shape the trim strip to a contour corresponding to that of the mounted gasket and to attach the strip to the gasket. Further, it is most difficult to achieve uniform lateral alignment between the trim and gasket along the length of the gasket. Considerable time may be spent attempting to achieve such alignment, thus increasing the installation costs of such an assembly. Moreover, if proper alignment is not achieved the decorative appearance of the assembly is somewhat less than desirable.

The foregoing disadvantages, and others, of gasket and trim assemblies hertofore known are overcome in accordance with the present invention by providing a gasket and decorative trim assembly comprised of elongate gasket means of resilient material including sealing means and which is mountable for the sealing means to sealingly engage underlying surface means. The decorative trim means laterally overlies at least a portion of the outer surface of the gasket means and is substantially longitudinally coextensive with the gasket means. The gasket means and trim means are provided with cooperable projection and recess means which provide for interengagement thereof prior to mounting of the assembly and further provide for uniform lateral alignment therebetween. The cooperable projection and recess means provide for the gasket and trim means to be interengaged within a small area therebetween relative to the lateral widths thereof and in a manner whereby the structural integrity of the gasket means is retained and the trim means does not interfere with the bending or flexing of the gasket means. Thus, the desired bending, sealing and retention capabilities of the gasket are achieved regardless of the lateral width of the trim means relative to the lateral width of the gasket means.

In accordance with another aspect of the invention, the gasket means is provided with recess means and the trim means is provided with projection means adapted to be introduced into the recess means and which, when so introduced, provides for the gasket means and trim means to be interengaged in a manner whereby unintended separation of the trim means from the gasket means is restrained. Moreover, the location and size of the recess means is such that the structural integrity of the gasket means is retained while at the same time the decorative trim means is interengaged therewith against unintended separation therefrom. Still further, the structural configuration of the recess means and projection means by which the gasket means and trim means are interengaged is such that the restraint against separation thereof is increased when the assembly is in its mounted disposition.

In accordance with yet another aspect of the present invention, the projection means extends longitudinally of the decorative trim means and is dimensionally small in the direction transversely of the trim means. Similarly, the recess means extends longitudinally of the gasket means and is dimensionally small transversely of the gasket means. The recess and projections means accordingly provides cooperable interengaging means between the gasket means and trim means requiring only a small transverse area of the gasket means and trim means whereby the structural integrity of the gasket means is not adversely affected and whereby the transverse width of the trim means relative to the transverse width of the gasket means can be varied as desired.

In accordance with yet a narrower aspect of the present invention the gasket means is mountable relative to a vehicle window opening and is operable to retain a glass window panel in place relative to the opening and to seal the joint between the window panel and vehicle panel means adjacent the opening. The interengaging slot and projection means advantageously provides for the structural integrity of the gasket means to be retained so that the window panel is adquately retained against outward displacement from the window opening, and the space between the window pane and panel means of the vehicle is adequately sealed by the gasket means. At the same time, the cooperable recess and projection means facilitates providing the gasket means with decorative trim means to provide the vehicle window with a border which is decorative in appearance and which may have a width structurally independent of the width of the gasket means.

It is accordingly an outstanding object of the present invention to provide a gasket and decorative trim assembly wherein gasket means and decorative trim means are structurally associated in a manner whereby the lateral dimensions of the gasket means and trim means are independent of one another.

A further object is the provision of a gasket and decorative trim means are structurally associated in a manner whereby uniform lateral alingment therebetween is assured.

Another object of the present invention is to provide a gasket and decorative trim assembly wherein gasket means and decorative trim means are structurally associated in a manner whereby the lateral dimension of the trim means relative to the lateral dimension of the gasket means does not interfere with the sealing and bendability functions of the gasket means.

Yet another object of the present invention is the provision of a gasket and decorative trim assembly of the above character wherein gasket means and decorative trim means are structurally associated in a manner whereby the strength characteristics of the gasket means are not adversely effected.

Another object of the present invention is the provision of a gasket and decorative trim assembly of the above character wherein the gasket means and trim means are structurally interrelated in a manner whereby they can be pre-assembled with one another and assembled as a unit relative to underlying surface means.

Still a further object of the present invention is the provision of a gasket and decorative trim assembly wherein the gasket means and decorative trim means are interengaged in an area thereof which, in the lateral directions thereof is considerably less than the lateral dimension of the trim means.

Another object of the present invention is the provision of a gasket and decorative trim assembly of the above character wherein the gasket means and decorative trim means are structurally interengaged in a manner whereby the gasket means is laterally bendable without the sealing capability thereof being adversely effected.

Yet another object of the present invention is the provision of a gasket and decorative trim assembly of the above character in which the trim means and gasket means are structurally interrelated in a manner whereby the gasket means clampingly engages a narrow longitudinally extending portion of the trim means, whereby the area of the gasket means underlying portions of the trim means extending laterally outwardly from the narrow portion thereof is freely movable relative to the trim means.

The foregoing objects of the present invention will in part be obvious and in part more fully pointed out hereinafter in conjunction with the description of the drawing in which.

Figure 1:
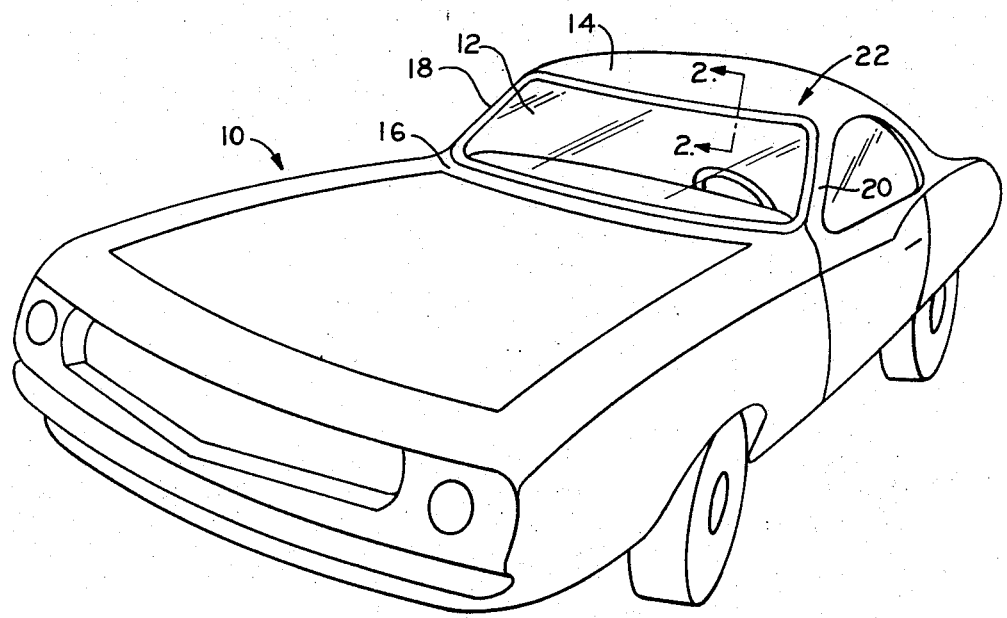
FIG. 1 is a perspective view of a portion of a vehicle and illustrating a gasket and decorative trim assembly of the present invention extending about the vehicle windshield.
Figure 2:
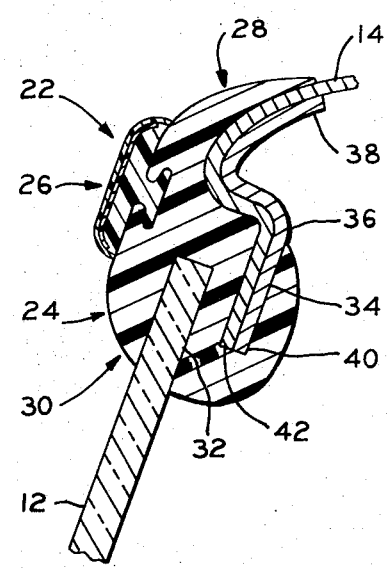
FIG. 2 is a sectional elevation taken along line 2—2 in FIG. 1.

Referring now to the drawings in greater detail wherein the showings are for the purpose of illustrating a preferred embodiment of the present invention only and not for the purpose of limiting the same, a vehicle 10 such as an automobile is illustrated in FIG. 1 having a glass window panel 12 mounted relative to a window opening bounded at the top and bottom edges thereof by vehicle panel means 14 and 16, respectively, and along the sides thereof by vehicle panel means 18 and 20. Window panel 12 is mounted relative to the window opening by a gasket and decorative trim assembly 22 which extends peripherally about window panel 12. The structural relationship between the window opening, window panel 12 and gasket and decorative trim assembly 22 at the top of the window opening is illustrated in FIG. 2, and it will be appreciated that this structural relationship exists about the entire periphery of the window panel. More particularly, the gasket and decorative trim assembly includes gasket means 24 of resilient material such as rubber and decorative trim means 26. Gasket means 24 includes sealing means 28 and 30 adapted to sealingly engage underlying surface means defined in this instance by vehicle panel means 14 and window panel 12, respectively. Thus, the joint between panel means 14 and window panel 12 is sealed against the ingress of air, water, or the like therethrough. In the embodiment illustrated, gasket means 24 is provided with recess means 32 adapted to receive the marginal edge of window panel 12, and recess means 34 adapted to receive flange means extending about the window opening and by which the gasket means is mountable relative to the opening. The flange means defining the window opening may be provided in any desired manner and, as illustrated, may be defined by suitable sheet metal bracket means having a portion 38 attached to vehicle panel means 14 and a portion 40 projecting inwardly of the window opening and substantially parallel to window panel 12. Further, if desired, the mounting flange means can be defined by extending the terminal end of vehicle panel means 14 to define a flange portion 42 which is parallel to and coextensive with portion 40 of bracket means 36. It will be clearly understood, however, that any suitable mounting flange means for the gasket and trim assembly could be provided.

Figure 3:
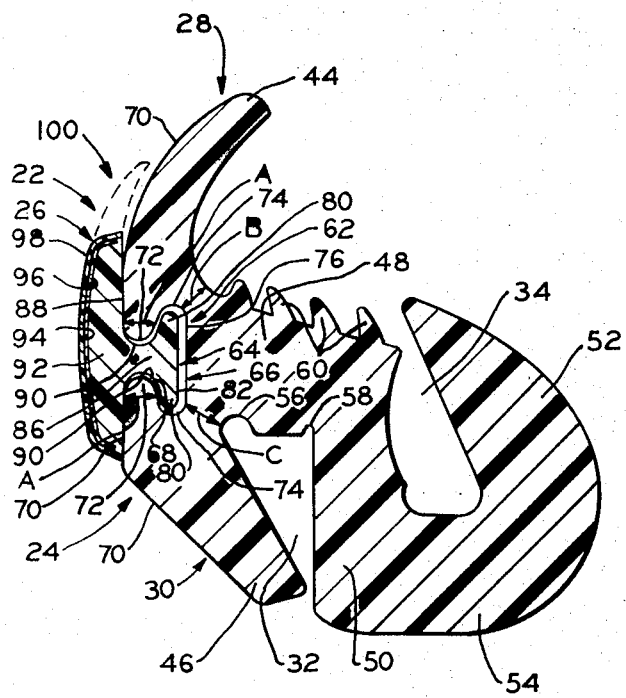
FIG. 3 is a perspective view, in section, of a preferred embodiment of a gasket and decorative trim assembly made in accordance with the present invention and in which the assembly is illustrated in an unmounted disposition.

The structure of gasket and decorative trim assembly 22 is best illustrated in FIG. 3 of the drawing. In this respect, sealing means 28 and 30 of gasket means 24 are in the form of flanges or lips 44 and 46, respectively, which project laterally outwardly from body portion 48 of the gasket means and extend longitudinally along opposite sides of the body portion. Body portion 48 has a cross-sectional configuration which provides longitudinally extending leg means 50 and 52 interconnected in an area 54 therebetween so as to define longitudinal recess means 34 for mounting the gasket means on flange means extending about a vehicle window opening as set forth hereinabove. It will be noted that leg portions 50 and 52 have a normal disposition when the gasket means is not mounted in which the leg portions extend toward one another so as to substantially close the entrance to recess means 34. This provides for legs 50 and 52 to resiliently and clampingly engage the mounting flange means to insure tight interengagement therebetween. Flange or lip means 46 and leg portion 50 extend from body portion 48 in a manner to define longitudinal recess means 32 for window panel 12 as set forth hereinabove. In the unmounted disposition of gasket means 24, flange means 46 has a normal disposition in which it extends toward leg portion 50 so as to substantially close the entrance to recess means 32. This structural configuration provides for flange means 46 to be displaced forwardly of body portion 48 against the inherent resiliency of the gasket material to receive the window panel, whereby the resiliency of the gasket material biases flange means 46 to sealingly engage the corresponding surface of the window panel. The inner end of recess means 32 may be defined in part by arcuate corner means 56 and 58 which permit the material of the gasket means to be flexed to receive window panel 12 in a manner whereby the material of the gasket means adjacent these corners is not stressed to the extent that a rupture of the material occurs in these areas. Body portion 48 further is preferably provided with a plurality of longitudinally extending rib elements 60 for sealing engagement with an opposed surface of the mounting flange means, and flange or lip means 44 is, of course, adapted to sealingly engage an underlying surface defined, in the embodiment illustrated, by metallic panel means of the vehicle extending about the periphery of the window opening. Flange means 44 is displaced forwardly of body portion 48 when the gasket means is mounted, against the inherent resiliency of the gasket material, whereby flange means 44 is biased into sealing engagement with the underlying surface means by the resiliency of the gasket material.

Mounting and sealing gasket means generally of the above character have been provided heretofore for the purpose of sealingly engaging spaced apart underlying surface means such as that defined by a window panel and body panel of a vehicle. Such gasket components generally are constructed of resilient material such as rubber having a durometer hardness which provides the resiliency necessary to achieve bending and flexing of the gasket during mounting thereof and at the same time provide adequate sealing engagement between the gasket means and the underlying surface means. A gasket component having a durometer hardness of 65 ±5 on the Shore A scale, 15 second delay method, provides the desired structural and sealing characteristics. Other materials and rubber of other hardnesses may, of course, be employed depending on such considerations as the extent to which the gasket component must be flexed or bent in a direction lateral to the axis thereof. With regard in particular to the mounting and sealing of windshield panels, it is only necessary to be sure that the material employed and the structural configuration and integrity of the gasket means is sufficient to provide for approximately 75 percent of the window panel to be retained in place relative to the window opening in response to an impact force thereagainst such as might result from a person being impelled into engagement with the window panel during an accident.

As mentioned hereinbefore, in the mounting of a fixed window panel relative to a vehicle body it is often desirable to provide the gasket means with decorative trim means so that the window panel is provided with a border or the like which is decorative in appearance. Such a decorative appearance must, of course, be achieved without affecting the structural integrity of the gasket component and without affecting the bending and sealing ability of the gasket component. Thus, in accordance with the present invention, decorative trim means 26 and gasket means 24 are adapted to be structurally interrelated or interengaged by cooperable projection and recess means 62 therebetween. In the preferred embodiment, projection and recess means 62 is defined by longitudinally extending projection means 64 on trim means 26 and longitudinally extending recess means 66 in gasket means 24. Preferably, the projection means and recess means are longitudinally coextensive with the corresponding trim and gasket means, but it will be appreciated that the projection and recess means could be interrupted along the lengths thereof. Projection means 64 and recess means 66 are cooperatively contoured in cross section and, in this respect, are substantially T-shaped in cross-section. More particularly, recess means 66 includes a narrow entrance portion 68 extending inwardly of body portion 48 of the gasket means from outer surface 70 thereof. Entrance portion 68 has opposed sides 72 which preferably are of arcuate contour. The inner portion of recess means 66 is laterally expanded relative to entrance portion 68 to define opposite sides 74 which are spaced apart a distance greater than the distance between the entrance sides 72. Further, the inner end of recess means 66 is defined by wall portion 76 having opposite ends merging with sides 74.

Projection means 64 is similar in cross-sectional contour to the contour of recess means 66. In this respect, projection means 64 includes laterally projecting portions 80 disposed adjacent recess portions 74 when the trim means and gasket means are in assembled relationship. Further, the inner end of projection means 64 is defined by wall portion 82 similar in contour to wall portion 76 of recess means 66. Still further, projection means 64 includes a narrow connecting portion 86 between the bottom surface 88 of trim means 26 and portions 80 of the projection means. Connecting portion 86 includes opposite side surfaces 90 which preferably have an arcuate contour corresponding substantially to the contour of opposite sides 72 of entrance portion 68 of recess means 66.

Gasket means 24 and decorative trim means 26 can be assembled or interengaged in any suitable manner such as by the use of a tool operable to spread the entrance to recess means 66 so as to permit portions 80 of projection means 64 to move therepast. Further, it will be appreciated that the components can be assembled by introducing projection means 64 longitudinally into recess means 66. Preferably, prior to mounting of the gasket and decorative trim assembly relative to a window opening, the cross-sectional contours of the projection means and recess means is such that there is a slight spacing between recess entrance side portions 72 and the corresponding opposed surfaces 90 of connecting portion 86 and between recess sides 74 and portions 80 of projection means 64. Upon mounting of the gasket and trim assembly relative to a vehicle window opening flange portions 44 and 46 of the gasket means are displaced forwardly as mentioned hereinabove, and such displacement causes wall portions 72 and sides 74 of the recess means to move in a direction tending to narrow the entrance whereby wall portions 72, preferably, tightly engage the corresponding one of the surfaces 90 of the projection means. Such engagement further enhances the cooperative interengagement of the gasket means and trim means against unintended separation thereof. Preferably, bottom surface 88 of trim means 26 is contoured such that outer surface 70 of the gasket means engages therewith when the assembly is mounted giving the appearance that the trim means is integral with the gasket means.

It is to be noted that recess means 66 is located substantially centrally relative to the lateral dimension of body portion 48 of gasket means 24. This provides for retaining the structural integrity of the gasket means necessary to assure retention of the window panel thereby and sealing engagement of the sealing means thereof with underlying surface means defined by the window panel and vehicle body panel means. Further, it will be appreciated that the projection means in being contoured to substantially laterally fill the recess means defines a core like element extending along the gasket means to prevent constriction of the gasket material in this area in response to a forward movement of the corresponding marginal edge of a window panel such as might occur in response to an impact against the inner surface of the window panel. By preventing constriction of the gasket material substantially centrally of body portion 48 any tendency for the window panel to be displaced forwardly and out of recess means 32 in the gasket means as a result of such constriction is advantageously restrained.

The portion of trim means 26 exposed relative to outer surface 70 of gasket means 24 may be of any desired cross-sectional configuration and lateral width. A preferred structure of the trim means is illustrated in FIG. 3. In this respect, trim means 26 includes a body portion 92 of a vinyl polymeric material, preferably polyvinyl chloride, having an arcuately contoured outer surface 94. The trim means is provided with a decorative appearance which may, for example, be defined by a thin film 96 of metal foil or of metallized clear polyethylene terephthalate suitably secured to outer surface 94 such as by adhesive bonding. Further, a protective film of clear plastic material 98 such as polyvinyl chloride preferably overlies film 96. Thus, the metal foil or the metallized surface of the polyethylene terephthalate is visible to provide the trim means with the appearance of a metal strip. Preferably, body portion 92 of trim means 26 is integral with projection means 64. This structure facilitates production of trim means 26 by an extrusion process. In order for body portion 92 to adequately support film 96 against wrinkling or crazing upon bending of the gasket and trim structure the vinyl material of the body portion preferably has a durometer hardness of between 89 to 95 on the Shore A scale, 15 second delay method. It will be appreciated therefore that the trim strip is of a hardness much greater than that of the gasket.

It is to be noted that the only area of interconnection between gasket means 24 and trim means 26 is the narrow area defined by projection means 64 and recess means 66. Thus, the lateral width of the exposed portion of trim means 26 can vary as desired relative to the overall lateral width of the gasket means. For example, trim means 26 could readily be extended laterally in either direction relative to projection means 64 such as indicated by broken lines 100 in FIG. 3. It will be appreciated that if the trim means and gasket means were interconnected such as by adhesive bonding or other interconnection means involving a considerable lateral area therebetween, that lateral flexibility of the gasket means would be decreased, whereby the sealing ability thereof would be disadvantageously reduced. Conversely, the inter-engaging relationship between the gasket means and trim means in accordance with the present invention provides for trim means to be employed having any desired lateral dimension relative to that of a given gasket or, alternatively, the use of a gasket having a narrower lateral dimension than heretofore possible for trim means having a given lateral dimension. This is possible in accordance with the present invention because the entire lateral areas between the trim means and gasket means to either side of the narrow area of connection therebetween are free to move relative to one another.

With regard to specific dimensions of the gasket means and trim means, it will be appreciated that the dimensions will vary in accordance with the use to which the assembly is put, the extent to which the assembly must be laterally flexed or bent and the degree of sealing engagement desired between the gasket means and underlying surface means. In any event, however, it will be appreciated that recess means 66 will have a cross sectional contour small enough to prevent an undesirable loss of structural integrity for the gasket means, that the entrance portion thereof will be narrow enough to assure the desired retention of the projection means relative to the gasket means when the assembly is in its mounted disposition, and that the lateral width of connecting portion 86 of the trim means will be sufficient to prevent tearing of body portion 92 from the inner portion of the projection means. As exempletive of such dimensional relationships in the embodiment illustrated, the gasket has an overall lateral width of approximately 1.16 inches, body portion 48 has a lateral width of approximately 0.25 inch, recess sides 74 have a normal lateral width of approximately 0.26 inch, entrance walls 72 are normally spaced apart approximately 0.08 inches and the recess has a depth inwardly of surface 70 of approximately 0.16 inch. Further, the areas of the gasket defining the entrance portion of the recess means have dimensions A, as illustrated in FIG. 3, of approximately 0.08 inch, flange 44 has a dimension in the area B of approximately 0.09 inch and flange 46 has a dimension in the area C of approximately 0.11 inch. The dimensions in the areas B and C assure that structural integrity of the gasket is retained in these areas. It will be appreciated, of course, that these dimensions may vary somewhat and that the corresponding dimensions of different gasket and trim assemblies will vary depending on the particular structures and uses thereof. It will be further appreciated from the foregoing exempletive dimensions that the lateral area of connection between the gasket means and trim means is quite small in comparison to the total lateral width of the gasket.

While the preferred embodiment of the present invention has been described herein in conjunction with a specific structure for the gasket means and trim means and with regard to a specific configuration for the interengaging projection and recess means between the gasket means and trim means, it will be appreciated that these structural characteristics are merely illustrative of preferred embodiments. Many possible embodiments of the present invention may be made and many possible changes may be made in the embodiment herein set forth. Accordingly, it is to be distinctly understood that the foregoing descriptive matter is to be interpreted merely as illustrative of the present invention and not as a limitation.

I claim:

1. A gasket and decorative trim strip assembly, comprising an elongate gasket of rubber and a decorative trim strip of plastic material, said gasket being mountable on underlying support means and having an outer surface and a T-shaped recess longitudinally coextensive therewith, said recess having an inner portion and an entrance thereto from said outer surface, said entrance having laterally opposed sides spaced apart a first distance, said recess having a depth in the direction from said outer surface of about twice said first distance, said inner portion of said recess having a depth in said direction about equal to said first distance and a lateral width of about three times said first distance, said trim strip having a body portion overlying said outer surface of said gasket and T-shaped projection means extending from said body portion and including a first portion disposed between said opposed sides of said entrance and a second portion extending laterally of said first portion and disposed in said inner portion of said recess, said projection means having an area in cross section less than that of said recess for said first and second portions of said projection means to be spaced from the respective opposed sides of said entrance and surfaces of said inner portion of said recess, said gasket including sealing flanges extending laterally with respect to said recess and rearwardly with respect to said outer surface of said gasket for sealing engagement with corresponding underlying surface means when said gasket is mounted on underlying support means, said sealing flanges being displaced forwardly upon engagement with said underlying surface means to displace said opposed sides of said entrance towards engagement with said first portion of said projection means to engage said first portion therebetween.

2. A gasket and decorative trim strip assembly for mounting a fixed window panel of a vehicle relative to frame means defining the window opening comprising: an elongate gasket of rubber mountable on said frame means including a first recess for receiving a marginal edge of a window pane, a first sealing flange to sealingly engage a surface of said window pane and a second sealing flange to sealingly engage surface means of said vehicle laterally separate from said marginal edge of said window pane, said gasket further including an outer surface and a second recess longitudinally coextensive therewith, said second recess having an inner portion and an entrance thereto from said outer surface, said entrance having laterally opposed sides spaced apart a first distance, said second recess having a depth in the direction from said outer surface of about twice said first distance, said inner portion of said second recess having a depth in said direction about equal to said first distance and a lateral width of about three times said first distance, said assembly further including a trim strip of plastic material having a body portion overlying said outer surface of said gasket and projection means extending from said body portion and including a first portion disposed between said opposed sides of said entrance and a second portion extending laterally from said first portion and disposed in said inner portion of second said recess, said projection means having an area in cross section less than that of said second recess for said first and second portions of said projection means to be spaced from the respective opposed sides of said entrance and surfaces of said inner portion of said second recess, said first and second sealing flanges of said gasket extending laterally of said second recess and rearwardly of said outer surface of said gasket for engagement with the corresponding one of said surfaces of said window pane and vehicle when said gasket is mounted, said first and second sealing flanges being displaced forwardly by said engagement, and said forward displacement of said first and second sealing flanges displacing said opposed sides of said entrance of said second recess laterally inwardly to engage said first portion of said projection means therebetween.

3. The gasket and trim strip assembly according to claim 2, wherein said body portion of said trim strip has a contoured outer surface carrying decorative film means.

* * * * *